US012780737B2

(12) United States Patent
Wang et al.

(10) Patent No.: US 12,780,737 B2
(45) Date of Patent: Nov. 3, 2026

(54) TWO-COMPONENT MICROWAVE FERRITE MATERIAL, PREPARATION METHOD THEREFOR AND APPLICATION THEREOF

(71) Applicant: HENGDIAN GROUP DMEGC MAGNETICS CO., LTD, Dongyang City (CN)

(72) Inventors: Yuanzhen Wang, Dongyang City (CN); Yangzhong Du, Dongyang City (CN); Likang Zhang, Dongyang City (CN); Feiyu Lv, Dongyang City (CN)

(73) Assignee: Hengdian Group DMEGC Magnetics Co., Ltd, Dongyang City (CN)

( * ) Notice: Subject to any disclaimer, the term of this patent is extended or adjusted under 35 U.S.C. 154(b) by 612 days.

(21) Appl. No.: 18/263,886

(22) PCT Filed: Jun. 30, 2021

(86) PCT No.: PCT/CN2021/103496

§ 371 (c)(1),
(2) Date: Aug. 1, 2023

(87) PCT Pub. No.: WO2022/222269

PCT Pub. Date: Oct. 27, 2022

(65) Prior Publication Data

US 2024/0067568 A1 Feb. 29, 2024

(30) Foreign Application Priority Data

Apr. 22, 2021 (CN) ........................ 202110436445.4

(51) Int. Cl.

| | |
|---|---|
| ***C04B 35/26*** | (2006.01) |
| ***C04B 35/626*** | (2006.01) |
| ***C04B 35/64*** | (2006.01) |
| ***H01F 1/34*** | (2006.01) |

(52) U.S. Cl.

CPC ...... *C04B 35/2641* (2013.01); *C04B 35/6261* (2013.01); *C04B 35/62655* (2013.01); *C04B 35/62695* (2013.01); *C04B 35/64* (2013.01); *H01F 1/346* (2013.01); *C04B 2235/3208* (2013.01); *C04B 2235/3217* (2013.01); *C04B 2235/3224* (2013.01); *C04B 2235/3225* (2013.01); *C04B 2235/3239* (2013.01); *C04B 2235/5436* (2013.01); *C04B 2235/5445* (2013.01); *C04B 2235/606* (2013.01); *C04B 2235/608* (2013.01); *C04B 2235/6562* (2013.01); *C04B 2235/6583* (2013.01); *C04B 2235/764* (2013.01)

(58) Field of Classification Search

CPC . H01F 1/346; C04B 35/2641; C04B 35/6261; C04B 35/62655; C04B 35/62695; C04B 35/65; C04B 2235/3217; C04B 2235/3224; C04B 2235/3225; C04B 2235/3239; C04B 2235/3208; C04B 2235/606; C04B 2235/608; C04B 2235/6583; C04B 2235/6562; C04B 2235/764

See application file for complete search history.

(56) References Cited

U.S. PATENT DOCUMENTS

2024/0286959 A1* 8/2024 Wang .................. C04B 35/2675

FOREIGN PATENT DOCUMENTS

| | | |
|---|---|---|
| CN | 102584200 | 7/2012 |
| CN | 103803959 | 5/2014 |
| CN | 103833347 | 6/2014 |
| CN | 106747397 | 5/2017 |
| CN | 109867518 | * 6/2019 |
| CN | 110451948 | 11/2019 |
| CN | 111285673 | 6/2020 |
| CN | 111620682 | 9/2020 |
| CN | 112876230 | * 1/2021 |
| CN | 112679204 | 4/2021 |
| JP | 56-78102 | * 6/1961 |
| JP | 57-42544 | * 10/1982 |
| JP | 2005-97042 | * 4/2005 |
| JP | 2005097043 | 4/2005 |

OTHER PUBLICATIONS

English Translation of CN Office action dated Oct. 22, 2021 from corresponding Chinese Patent Application No. 2021-10436445.4.
English Translation of International Search Report dated Jan. 19, 2022 from corresponding PCT Application No. PCT/CN2021/103496.

* cited by examiner

*Primary Examiner* — C Melissa Koslow
(74) *Attorney, Agent, or Firm* — ArentFox Schiff LLP

(57) ABSTRACT

A two-component microwave ferrite material, a preparation method therefor and an application thereof. The two-component microwave ferrite material comprises a first microwave ferrite material and a second microwave ferrite material. The preparation method comprises the following steps: (1) mixing a first microwave ferrite material and a second microwave ferrite material according to a formula amount, and then performing wet ball milling to obtain a ball abrasive; (2) drying the ball abrasive, sieving, and granulating; and (3) sequentially forming and sintering the granulated particles obtained in step (2) to obtain a two-component microwave ferrite material.

9 Claims, No Drawings

TWO-COMPONENT MICROWAVE FERRITE MATERIAL, PREPARATION METHOD THEREFOR AND APPLICATION THEREOF

CROSS REFERENCE TO RELATED APPLICATION(S)

This application is a National Phase entry of PCT Application No. PCT/CN2021/103496, entitled "TWO-COMPONENT MICROWAVE FERRITE MATERIAL, PREPARATION METHOD THEREFOR AND APPLICATION THEREOF" and filed on Jun. 30, 2021, which claims priority of Chinese Application No. 202110436445.4 entitled "TWO-COMPONENT MICROWAVE FERRITE MATERIAL, PREPARATION METHOD THEREFOR AND APPLICATION THEREOF" and filed on Apr. 22, 2021, both of which are expressly incorporated by reference herein in their entirety.

TECHNICAL FIELD

The present application belongs to the field of magnetic materials for microwave communication, and relates to a two-component microwave ferrite material, a preparation method therefor and an application thereof.

BACKGROUND

Microwave ferrite devices occupy an important position in microwave technology and have wide applications in the fields of aerospace, satellite communication, electronic countermeasures, mobile communication and medical treatment. As the core of the devices, microwave ferrite materials are largely used in microwave ferrite circulators and isolators and implement technical processing in terms of isolation of microwave transmission in microwave systems.

With the rapid development of microwave technology, the systems have increasingly urgent requirements on the miniaturization of components. A ferrite component has a much larger volume than other components, so the task of miniaturizing and lightweight ferrite component is particularly important.

A circulator works in two types of magnetic field regions: a high field region and a low field region. Working in the low field region means that a working internal field of a ferrite is below a resonance field at such a working frequency, where the resonance field is determined by $H_r=\omega/\gamma$, the working internal field is $H_i<H_r$, a normalization internal field is expressed as $\sigma=H_i/H_r$. During working in a low field, $\sigma<<1$, the ferrite works substantially in a zero field (generally $\sigma=0\text{-}0.2$), and when $\sigma$ is increased, $\mu_e<0$ enters an abnormal mode. A circulator working in the low field is generally applicable to a high frequency band typically having a frequency of 1 GHz or above. Both a high field and the low field can be used in S and L wavebands. At a higher frequency, the circulator is not suitable for working in the high field because magnetic saturation is not easily reached due to too high a magnetizing field, especially in a waveguide system. It is also difficult to work in the low field at too low a frequency due to the increased zero field loss. The circulator design of a low-field circulator relating high field has the characteristics of an ultra-wideband, a small applied magnetic field and a required low saturation of ferrite.

Some patent documents have already been provided on a microwave ferrite material and a preparation method therefor. For example, CN102584200A discloses a microwave ferrite material with an ultra-low loss and a small linewidth and preparation thereof. The material has a chemical formula of $Y_{3-2x-y}Ca_{2x+y}Fe_{5-x-y-z}V_xZr_yAl_zO_{12}$. A preparation method includes calculating and weighing raw materials according to stoichiometry, vibratory ball-milling, pre-sintering, vibratory grinding for coarse pulverization, sand grinding for fine pulverization, spray granulating, press molding and sintering. This technical solution can be used in the fields of microwave communication and magnetic materials. This method discloses that the microwave ferrite material has a ferromagnetic resonance linewidth $\Delta H\leq1.27$ KA/m and a dielectric loss $tg\delta_c\leq0.5\times10^{-4}$ and provides the microwave ferrite material with an ultra-low loss and a small linewidth. A relatively high pre-sintering temperature and a relatively high sintering temperature are required in the preparation process, which is unfavorable for production and environmental protection.

CN103833347A discloses a microwave ferrite material with a small linewidth and a high Curie temperature and a preparation method therefor. The material has a chemical formula of $Y_{3-x}Ca_xSn_xMn_yFe_{5-x-y-z}O_{12}$. The preparation method includes calculating and weighing raw materials according tostoichiometry, primary wet ball milling, pre-sintering, secondary wet ball milling, dry granulating, press molding and sintering. The microwave ferrite material obtained by this technical solution has a relatively small resonance linewidth and a relatively high Curie temperature.

CN111285673A discloses a microwave ferrite material with a high dielectric constant, a preparation method and a microwave communication device. The material has a chemical formula of $Bi_{1.25}Ca_{0.25+2x}Y_{1.5-2x}Zr_{0.25}Al_xMn_yFe_{4.75-x-y}$. The preparation method includes calculating and weighing raw materials according to stoichiometry, wet ball milling and mixing, drying and sieving, pre-sintering, wet ball milling for fine pulverization, spray granulating, press molding and sintering. The microwave ferrite material obtained by this technical solution has a high dielectric constant.

The above patents provide microwave ferrite materials having different characteristics, but which have relatively high saturation magnetic moments and are unsuitable for working in the low field. Therefore, it is necessary to further improve the performance of a microwave ferrite material. It has already become a tendency to provide a microwave ferrite material having a low loss, a low saturation magnetic moment, a small linewidth and a high Curie temperature.

SUMMARY

An object of the present application is to provide a two-component microwave ferrite material, a preparation method therefor and an application thereof. The two-component microwave ferrite material provided in the present application has the characteristics of a small linewidth, a high Curie temperature, a low saturation magnetic moment and a low loss, thereby greatly improving the stability and reliability of the microwave ferrite material.

To achieve the object, the present application adopts the technical solutions described below.

In a first aspect, the present application provides a two-component microwave ferrite material, where raw materials for preparing the two-component microwave ferrite material include a first microwave ferrite material and a second microwave ferrite material.

The first microwave ferrite material is $Y_{(3-2a-c-d-e)}Ca_{(2a+c+d+e)}Fe_{(5-a-b-c-d-e)}V_aAl_bZr_cSn_dMn_eO_{12}$, where a+b=0.5;

$0 \le a \le 0.5$, for example, a may be 0, 0.1, 0.2, 0.3, 0.4, or 0.5 but is not limited to the numerical values listed, and other unlisted numerical values within the numerical range are also applicable;

$0 \le b \le 0.5$, for example, b may be 0, 0.1, 0.2, 0.3, 0.4, or 0.5 but is not limited to the numerical values listed, and other unlisted numerical values within the numerical range are also applicable;

$0 \le c \le 0.7$, for example, c may be 0, 0.1, 0.2, 0.3, 0.4, 0.5, 0.6 or 0.7, but is not limited to the numerical values listed, and other unlisted numerical values within the numerical range are also applicable;

$0 \le d \le 0.7$, for example, d may be 0, 0.1, 0.2, 0.3, 0.4, 0.5, 0.6 or 0.7, but is not limited to the numerical values listed, and other unlisted numerical values within the numerical range are also applicable; and $0 \le e \le 0.7$, for example, e may be 0, 0.1, 0.2, 0.3, 0.4, 0.5, 0.6 or 0.7, but is not limited to the numerical values listed, and other unlisted numerical values within the numerical range are also applicable.

The second microwave ferrite material is $Gd_{(3-2A-C-D)}Ca_{(2A+C+D)}Fe_{(5-A-B-C-D-E)}V_A Al_B Ge_C In_D Ti_E O_{12}$, where A+B=0.4;

$0 \le A \le 0.4$, for example, A may be 0, 0.1, 0.2, 0.3, or 0.4 but is not limited to the numerical values listed, and other unlisted numerical values within the numerical range are also applicable;

$0 \le B \le 0.4$, for example, B may be 0, 0.1, 0.2, 0.3, or 0.4 but is not limited to the numerical values listed, and other unlisted numerical values within the numerical range are also applicable;

$0 \le C \le 0.7$, for example, C may be 0, 0.1, 0.2, 0.3, 0.4, 0.5, 0.6 or 0.7, but is not limited to the numerical values listed, and other unlisted numerical values within the numerical range are also applicable;

$0 \le D \le 0.7$, for example, D may be 0, 0.1, 0.2, 0.3, 0.4, 0.5, 0.6 or 0.7, but is not limited to the numerical values listed, and other unlisted numerical values within the numerical range are also applicable; and $0 \le E \le 0.7$, for example, E may be 0, 0.1, 0.2, 0.3, 0.4, 0.5, 0.6 or 0.7, but is not limited to the numerical values listed, and other unlisted numerical values within the numerical range are also applicable.

Optionally, a mass ratio of the first microwave ferrite material to the second microwave ferrite material is (1-3):(1-3), for example, the mass ratio may be 1:1, 1:2, 1:3, 2:3, 3:2 or 3:1, but is not limited to the numerical values listed, and other unlisted numerical values within the numerical range are also applicable.

A pure yttrium iron garnet ferrite has a relatively low power carrying capability, a relatively large ferromagnetic resonance linewidth and a relatively large dielectric loss, requires a relatively high sintering temperature, and is relatively simple in performance. In the present application, the replacement of part of octahedral $Fe^{3+}$ with $Zr^{3+}$ can reduce the magnetocrystalline anisotropy constant so that the ferromagnetic resonance linewidth decreases. However, $Zr^{3+}$ cannot be too much, and too much $Zr^{3+}$ will cause the ferromagnetic resonance linewidth to rapidly increase. The replacement of part of $Fe^{3+}$ with $V^{5+}$ can reduce saturation magnetization intensity and maintain a relatively high Curie temperature. $Ca^{2+}$ and $V^{5+}$ are substances with low melting points, and the doping of $Ca^{2+}$ and $V^{5+}$ can reduce the sintering temperature. The replacement of part of $Fe^{3+}$ with a small amount of $Mn^{2+}$ can reduce the ferromagnetic resonance linewidth and dielectric loss of the material. The replacement of $V^{3+}$ with $Gd^{3+}$ ions can improve a temperature coefficient of Ms, thus maintaining a relatively high Curie temperature. In the present application, the composition of the microwave ferrite material is adjusted so that the microwave ferrite material having a relatively low saturation magnetization intensity $4\pi Ms$, a relatively small ferromagnetic resonance linewidth $\Delta H$, a relatively low dielectric loss $tg\delta_e$ and a relatively high Curie temperature $T_c$ is obtained through the combination of electromagnetic characteristics of various elements.

In a second aspect, the present application provides a preparation method for the two-component microwave ferrite according to the first aspect. The method includes the following steps:

a. mixing the first microwave ferrite material and the second microwave ferrite material according to formula proportions, and then performing wet ball milling to obtain a ball-milled material;
b. drying, sieving and granulating the ball-milled material obtained in step (1); and
c. molding and sintering particles after the granulating in step (2) sequentially to obtain the two-component microwave ferrite material.

Optionally, the wet ball milling in step (1) includes mixing raw materials, grinding balls and a dispersion medium at a mass ratio of 1:(4-7.5):(0.6-2.5) and performing wet ball milling, for example, the mass ratio may be 1:4:0.6, 1:5:0.8, 1:6:1.2, 1:7:1.5, 1:7.5:2, 1:6.5:1.5, 1:4.5:2.5 or 1:5.5:2.5, but is not limited to the numerical values listed, and other unlisted numerical values within the numerical range are also applicable.

Optionally, the wet ball milling in step (1) is performed at a rotational speed of 20-80 r/min, for example, the rotational speed may be 20 r/min, 30 r/min, 40 r/min, 50 r/min, 60 r/min, 70 r/min or 80 r/min, but is not limited to the numerical values listed, and other unlisted numerical values within the numerical range are also applicable.

Optionally, the wet ball milling in step (1) is performed for 10-30 h, for example, the time may be 10 h, 15 h, 20 h, 25 h or 30 h, but is not limited to the numerical values listed, and other unlisted numerical values within the numerical range are also applicable.

Optionally, the grinding balls include zirconium balls or steel balls.

Optionally, the grinding balls include large-diameter grinding balls and small-diameter grinding balls.

Optionally, a mass ratio of the large-diameter grinding balls to the small-diameter grinding balls is (0.8-3):1, for example, the mass ratio may be 0.8:1, 1:1, 1.2:1, 1.4:1, 1.6:1, 1.8:1, 2:1, 2.2:1, 2.4:1, 2.6:1, 2.8:1 or 3:1, but is not limited to the numerical values listed, and other unlisted numerical values within the numerical range are also applicable.

Optionally, the large-diameter grinding balls have a diameter of 5-10 mm, for example, the diameter may be 5 mm, 6 mm, 7 mm, 8 mm, 9 mm or 10 mm, but is not limited to the numerical values listed, and other unlisted numerical values within the numerical range are also applicable; and the small-diameter grinding balls have a diameter of 1-4 mm, for example, the diameter may be 1 mm, 2 mm, 3 mm or 4 mm, but is not limited to the numerical values listed, and other unlisted numerical values within the numerical range are also applicable.

Optionally, the dispersion medium includes any one or a combination of at least two of deionized water, alcohol, acetone, n-propanol or aqueous ammonia.

Optionally, the ball-milled material has particle size ranges of D50=0.005-2 μm and D90=0.05-4 μm, for example, the particle size ranges may include D50=0.005

μm, 0.01 μm, 0.05 μm, 0.1 μm, 0.5 μm, 1 μm, 1.5 μm or 2 μm, and D90=0.05 μm, 0.1 μm, 0.5 μm, 1 μm, 1.5 μm, 2 μm, 3 μm or 4 μm, but are not limited to the numerical values listed, and other unlisted numerical values within the numerical ranges are also applicable.

Optionally, the drying in step (2) is performed at 100-250° C., for example, the temperature may be 100° C., 120° C., 150° C., 180° C., 200° C., 220° C. or 250° C., but is not limited to the numerical values listed, and other unlisted numerical values within the numerical range are also applicable.

Optionally, the drying in step (2) ends when a moisture content decreases to 0.01-10%, for example, the moisture content may be 0.01%, 0.1%, 1%, 3%, 5%, 7%, 9% or 10%, but is not limited to the numerical values listed, and other unlisted numerical values within the numerical range are also applicable.

Optionally, a sieve for the sieving in step (2) has a size of 30-100 mesh, for example, the mesh size may be 30, 40, 50, 60, 70, 80, 90 or 100, but is not limited to the numerical values listed, and other unlisted numerical values within the numerical range are also applicable.

Optionally, the granulating in step (2) includes mixing the sieved ball-milled material with a binder uniformly and sieving under pressure to obtain the granulated particles.

Optionally, the binder includes an aqueous solution of polyvinyl alcohol.

Optionally, the solution of polyvinyl alcohol has a concentration of 5-20 wt %, for example, the concentration may be 5 wt %, 10 wt %, 15 wt % or 20 wt %, but is not limited to the numerical values listed, and other unlisted numerical values within the numerical range are also applicable.

Optionally, a mass of the solution of polyvinyl alcohol is 5-10% of a mass of powder, for example, the percentage may be 5%, 6%, 7%, 8%, 9% or 10%, but is not limited to the numerical values listed, and other unlisted numerical values within the numerical range are also applicable.

Optionally, the sieving is performed under a pressure of 300-1200 $kg/cm^2$, for example, the pressure may be 300 $kg/cm^2$, 500 $kg/cm^2$, 700 $kg/cm^2$, 900 $kg/cm^2$, 1100 $kg/cm^2$ or 1200 $kg/cm^2$, but is not limited to the numerical values listed, and other unlisted numerical values within the numerical range are also applicable.

Optionally, a sieve for the sieving has a size of 30-100 mesh, for example, the mesh size may be 30, 40, 50, 60, 70, 80, 90 or 100, but is not limited to the numerical values listed, and other unlisted numerical values within the numerical range are also applicable.

Optionally, the molding in step (3) includes placing the granulated particles in step (2) into a mold and pressing the particles into a green body in a specified shape.

Optionally, the green body has a molding density of 3.0-4.0 $g/cm^3$, for example, the molding density may be 3.0 $g/cm^3$, 3.2 $g/cm^3$, 3.4 $g/cm^3$, 3.6 $g/cm^3$, 3.8 $g/cm^3$ or 4.0 $g/cm^3$, but is not limited to the numerical values listed, and other unlisted numerical values within the numerical range are also applicable.

Optionally, the sintering in step (3) is performed at 1200-1500° C., for example, the temperature may be 1200° C., 1250° C., 1300° C., 1350° C., 1400° C., 1450° C., 1480° C. or 1500° C., but is not limited to the numerical values listed, and other unlisted numerical values within the numerical range are also applicable.

Optionally, a heat preservation time for the sintering is 5-30 h, for example, the heat preservation time may be 5 h, 6 h, 8 h, 10 h, 12 h, 14 h, 16 h, 18 h, 20 h, 22 h, 24 h, 26 h, 28 h or 30 h. but is not limited to the numerical values listed, and other unlisted numerical values within the numerical range are also applicable.

Optionally, a heating rate of the sintering is 0.4-5° C./min, for example, the heating rate may be 0.4° C./min, 1° C./min, 1.5° C./min, 2° C./min, 2.5° C./min, 3° C./min, 3.5° C./min, 4° C./min, 4.5° C./min or 5.5° C./min, but is not limited to the numerical values listed, and other unlisted numerical values within the numerical range are also applicable.

Optionally, during the sintering, oxygen introduction begins at 1-6 h before heat preservation ends, for example, the time may be 1 h, 2 h, 3 h, 4 h, 5 h or 6 h, but is not limited to the numerical values listed, and other unlisted numerical values within the numerical range are also applicable.

Optionally, during the sintering, oxygen introduction ends at 100-500° C. lower than the sintering temperature, for example, the temperature may be 100° C. lower than the sintering temperature, 300° C. lower than the sintering temperature or 500° C. lower than the sintering temperature, but is not limited to the numerical values listed, and other unlisted numerical values within the numerical range are also applicable.

Optionally, a preparation method for the first microwave ferrite material in step (1) includes:

i. mixing raw materials for preparing the first microwave ferrite material according to formula proportions, and performing wet ball milling to obtain a ball-milled material; and ii. sequentially drying, sieving and pre-sintering the ball-milled material obtained in step (a) to obtain the first microwave ferrite material.

The first microwave ferrite material is $Y_{(3-2a-c-d-e)}Ca_{(2a+c+d+e)}Fe_{(5-a-b-c-d-e)}V_aAl_bZr_cSn_dMn_eO_{12}$, where $0 \le a \le 0.5$, $0 \le b \le 0.5$, $0 \le c \le 0.7$, $0 \le d \le 0.7$, $0 \le e \le 0.7$, and $a+b=0.5$.

Optionally, the raw materials for preparing the first microwave ferrite material in step (a) are $Y_2O_3$, $CaCO_3$, $Fe_2O_3$, $V_2O_5$, $Al_2O_3$, $ZrO_2$, $SnO_2$ and $MnCO_3$, respectively.

Optionally, the wet ball milling in step (a) includes mixing the raw materials, grinding balls, a dispersion medium and a dispersant at a mass ratio of 1:(4-7.5):(0.6-2.5):(0.003-0.01) and performing wet ball milling, for example, the mass ratio may be 1:4:0.6:0.003, 1:5:0.8:0.004, 1:6:1.2:0.005, 1:7:1.5:0.006, 1:7.5:2:0.007, 1:5:1.5:0.008, 1:6:2.5:0.009 or 1:6.5:2.5:0.01, but is not limited to the numerical values listed, and other unlisted numerical values within the numerical range are also applicable.

Optionally, the grinding balls in step (a) include zirconium balls.

Optionally, the grinding balls in step (a) include large-diameter grinding balls and small-diameter grinding balls.

Optionally, a mass ratio of the large-diameter grinding balls to the small-diameter grinding balls in step (a) is (0.8-3):1, for example, the mass ratio may be 0.8:1, 1:1, 1.2:1, 1.4:1, 1.6:1, 1.8:1, 2:1, 2.2:1, 2.4:1, 2.6:1, 2.8:1 or 3:1, but is not limited to the numerical values listed, and other unlisted numerical values within the numerical range are also applicable.

Optionally, the large-diameter grinding balls in step (a) have a diameter of 5-10 mm, for example, the diameter may be 5 mm, 6 mm, 7 mm, 8 mm, 9 mm or 10 mm, but is not limited to the numerical values listed, and other unlisted numerical values within the numerical range are also applicable; and the small-diameter grinding balls in step (a) have a diameter of 1-4 mm, for example, the diameter may be 1 mm, 2 mm, 3 mm or 4 mm, but is not limited to the numerical values listed, and other unlisted numerical values within the numerical range are also applicable.

Optionally, the dispersion medium in step (a) includes any one or a combination of at least two of deionized water, alcohol, acetone, n-propanol or aqueous ammonia.

Optionally, the dispersant in step (a) includes ammonium citrate and/or aqueous ammonia.

Optionally, the wet ball milling in step (a) is performed at a rotational speed of 20-80 r/min, for example, the rotational speed may be 20 r/min, 30 r/min, 40 r/min, 50 r/min, 60 r/min, 70 r/min or 80 r/min, but is not limited to the numerical values listed, and other unlisted numerical values within the numerical range are also applicable.

Optionally, the wet ball milling in step (a) is performed for 10-30 h, for example, the time may be 10 h, 15 h, 20 h, 25 h or 30 h, but is not limited to the numerical values listed, and other unlisted numerical values within the numerical range are also applicable.

Optionally, the ball-milled material has particle size ranges of D50=0.005-2 μm and D90=0.05-4 μm, for example, the particle size ranges may include D50=0.005 μm, 0.01 μm, 0.05 μm, 0.1 μm, 0.5 μm, 1 μm, 1.5 μm or 2 μm and D90=0.05 μm, 0.1 μm, 0.5 μm, 1 μm, 1.5 μm, 2 μm, 3 μm or 4 μm, but are not limited to the numerical values listed, and other unlisted numerical values within the numerical ranges are also applicable.

Optionally, the drying in step (b) is performed at 100-250° C., for example, the temperature may be 100° C., 120° C., 150° C., 180° C., 200° C., 220° C. or 250° C., but is not limited to the numerical values listed, and other unlisted numerical values within the numerical range are also applicable.

Optionally, the drying in step (b) ends when a moisture content decreases to 0.01-10%, for example, the moisture content may be 0.01%, 0.1%, 1%, 3%, 5%, 7%, 9% or 10%, but is not limited to the numerical values listed, and other unlisted numerical values within the numerical range are also applicable.

Optionally, a sieve for the sieving in step (b) has a size of 30-100 mesh, for example, the mesh size may be 30, 40, 50, 60, 70, 80, 90 or 100, but is not limited to the numerical values listed, and other unlisted numerical values within the numerical range are also applicable.

Optionally, the pre-sintering in step (b) is performed at 1100-1350° C., for example, the temperature may be 1100° C., 1120° C., 1160° C., 1200° C., 1240° C., 1280° C., 1320° C. or 1350° C., but is not limited to the numerical values listed, and other unlisted numerical values within the numerical range are also applicable.

Optionally, a heat preservation time for the pre-sintering in step (b) is 6-15 h, for example, the heat preservation time may be 6 h, 8 h, 10 h, 12 h, 14 h or 14 h, but is not limited to the numerical values listed, and other unlisted numerical values within the numerical range are also applicable.

Optionally, a heating rate for the pre-sintering in step (b) is 0.3-4° C./min, for example, the heating rate may be 0.3° C./min, 1.5° C./min, 2.5° C./min or 4° C./min, but is not limited to the numerical values listed, and other unlisted numerical values within the numerical range are also applicable.

Optionally, during the pre-sintering in step (b), oxygen introduction begins when the pre-sintering temperature is reached.

Optionally, during the pre-sintering in step (b), oxygen introduction ends at 100-500° C. lower than the pre-sintering temperature, for example, the temperature may be 100° C. lower than the pre-sintering temperature, 300° C. lower than the pre-sintering temperature or 500° C. lower than the pre-sintering temperature, but is not limited to the numerical values listed, and other unlisted numerical values within the numerical range are also applicable.

In the present application, the pre-sintering can reduce the non-uniformity of the chemical activity of the dried ball-milled material and can also reduce the shrinkage rate and deformation of the subsequent sintered product.

Optionally, a preparation method for the second microwave ferrite material in step (1) includes:

1. mixing raw materials for preparing the second microwave ferrite material according to formula proportions, and performing wet ball milling to obtain a ball-milled material; and
2. drying, sieving and pre-sintering the ball-milled material obtained in step (I) sequentially to obtain the second microwave ferrite material.

The second microwave ferrite material is $Gd_{(3-2A-C-D)}Ca_{(2A+c+D)}Fe_{(5-A-B-C-D-E)}V_AAl_BGe_CIn_DTi_EO_{12}$, where $0 \leq A \leq 0.4$, $0 \leq B \leq 0.4$, $0 \leq C \leq 0.7$, $0 \leq D \leq 0.7$, $0 \leq E \leq 0.7$, and $A+B=0.4$.

Optionally, the raw materials for preparing the second microwave ferrite material in step (I) are $Gd_2O_3$, $CaCO_3$, $Fe_2O_3$, $V_2O_5$, $Al_2O_5$, $GeO_2$, $InO_2$ and $TiO_2$, respectively.

Optionally, the wet ball milling in step (I) includes mixing the raw materials, grinding balls, a dispersion medium and a dispersant at a mass ratio of 1:(4-7.5):(0.6-2.5):(0.003-0.01) and performing wet ball milling, for example, the mass ratio may be 1:4:0.6:0.008, 1:5:0.8:0.009, 1:6:1.2:0.01, 1:7:1.5:0.003, 1:7.5:2:0.004, 1:1.5:1.5:0.005, 1:1:2.5:0.006 or 1:5:2.5:0.007, but is not limited to the numerical values listed, and other unlisted numerical values within the numerical range are also applicable.

Optionally, the grinding balls in step (I) include zirconium balls.

Optionally, the grinding balls in step (I) include large-diameter grinding balls and small-diameter grinding balls.

Optionally, a mass ratio of the large-diameter grinding balls to the small-diameter grinding balls in step (I) is (0.8-3):1, for example, the mass ratio may be 0.8:1, 1:1, 1.2:1, 1.4:1, 1.6:1, 1.8:1, 2:1, 2.2:1, 2.4:1, 2.6:1, 2.8:1 or 3:1, but is not limited to the numerical values listed, and other unlisted numerical values within the numerical range are also applicable.

Optionally, the large-diameter grinding balls in step (I) have a diameter of 5-10 mm, for example, the diameter may be 5 mm, 6 mm, 7 mm, 8 mm, 9 mm or 10 mm, but is not limited to the numerical values listed, and other unlisted numerical values within the numerical range are also applicable; and the small-diameter grinding balls in step (I) have a diameter of 1-4 mm, for example, the diameter may be 1 mm, 2 mm, 3 mm or 4 mm, but is not limited to the numerical values listed, and other unlisted numerical values within the numerical range are also applicable.

Optionally, the dispersion medium in step (I) includes any one or a combination of at least two of deionized water, alcohol, acetone, n-propanol or aqueous ammonia.

Optionally, the dispersant in step (I) includes ammonium citrate and/or aqueous ammonia.

Optionally, the wet ball milling in step (I) is performed at a rotational speed of 20-80 r/min, for example, the rotational speed may be 20 r/min, 30 r/min, 40 r/min, 50 r/min, 60 r/min, 70 r/min or 80 r/min, but is not limited to the numerical values listed, and other unlisted numerical values within the numerical range are also applicable.

Optionally, the wet ball milling in step (I) is performed for 10-30 h, for example, the time may be 10 h, 15 h, 20 h, 25 h or 30 h, but is not limited to the numerical values listed, and other unlisted numerical values within the numerical range are also applicable.

Optionally, the ball-milled material has particle size ranges of D50=0.005-2 μm and D90=0.05-4 μm, for example, the particle size ranges may include D50=0.005 μm, 0.01 μm, 0.05 μm, 0.1 μm, 0.5 μm, 1 μm, 1.5 μm or 2 μm and D90=0.05 μm, 0.1 μm, 0.5 μm, 1 μm, 1.5 μm, 2 μm, 3 μm or 4 μm, but are not limited to the numerical values listed, and other unlisted numerical values within the numerical ranges are also applicable.

Optionally, the drying in step (II) is performed at 100-250° C., for example, the temperature may be 100° C., 120° C., 150° C., 180° C., 200° C., 220° C. or 250° C., but is not limited to the numerical values listed, and other unlisted numerical values within the numerical range are also applicable.

Optionally, the drying in step (II) ends when a moisture content decreases to 0.01-10%, for example, the moisture content may be 0.01%, 0.1%, 1%, 3%, 5%, 7%, 9% or 10%, but is not limited to the numerical values listed, and other unlisted numerical values within the numerical range are also applicable.

Optionally, a sieve for the sieving in step (II) has a size of 30-100 mesh, for example, the mesh size may be 30, 40, 50, 60, 70, 80, 90 or 100, but is not limited to the numerical values listed, and other unlisted numerical values within the numerical range are also applicable.

Optionally, the pre-sintering in step (b) is performed at 1100-1400° C., for example, the temperature may be 1100° C., 1140° C., 1180° C., 1220° C., 1260° C., 1300° C., 1340° C., 1380° C. or 1400° C., but is not limited to the numerical values listed, and other unlisted numerical values within the numerical range are also applicable.

Optionally, a heat preservation time for the pre-sintering in step (II) is 8-20 h, for example, the heat preservation time may be 8 h, 10 h, 12 h, 14 h, 16 h, 18 h or 20 h, but is not limited to the numerical values listed, and other unlisted numerical values within the numerical range are also applicable.

Optionally, a heating rate for the pre-sintering in step (II) is 0.3-4° C./min, for example, the heating rate may be 0.3° C./min, 2° C./min, 3° C./min or 4° C./min, but is not limited to the numerical values listed, and other unlisted numerical values within the numerical range are also applicable.

Optionally, during the pre-sintering in step (II), oxygen introduction begins when the pre-sintering temperature is reached.

Optionally, during the pre-sintering in step (II), oxygen introduction ends at 100-500° C. lower than the pre-sintering temperature, for example, the temperature may be 100° C. lower than the pre-sintering temperature, 300° C. lower than the pre-sintering temperature or 500° C. lower than the pre-sintering temperature, but is not limited to the numerical values listed, and other unlisted numerical values within the numerical range are also applicable.

As an optional technical solution of the method of the present application, the method includes the following steps:

c. mixing the first microwave ferrite material and the second microwave ferrite material according to formula proportions, and then performing wet ball milling to obtain a ball-milled material; where the wet ball milling includes mixing raw materials, grinding balls and a dispersion medium at a mass ratio of 1:(4-7.5):(0.6-2.5) and performing wet ball milling for 10-30 h at a rotational speed of 20-80 r/min; and the ball-milled material has particle size ranges of D50=0.005-2 μm and D90=0.05-4 μm;

drying the ball-milled material obtained in step (1) at 100-250° C. until a moisture content decreases to 0.01-10%, sieving the ball-milled material by a 30- to 100-mesh sieve and then granulating;

where the granulating includes mixing the sieved ball-milled material with a binder uniformly and sieving by a 30- to 100-mesh sieve under a pressure of 300-1200 $kg/cm^2$ to obtain the granulated particles; and (3) sequentially molding and sintering the granulated particles in step (2) to obtain the two-component microwave ferrite material; where the molding includes placing the granulated particles in step (2) into a mold and pressing the particles into a green body in a specified shape, and the green body has a molding density of 3.0-4.0 $g/cm^3$; and the sintering has a temperature of 1200-1500° C., a heat preservation time of 5-30 h, and a heating rate of 0.4-5° C./min; during the sintering, oxygen introduction begins at 1-6 h before heat preservation ends; and during the sintering, oxygen introduction ends at 100-500° C. lower than the sintering temperature.

A preparation method for the first microwave ferrite material in step (1) includes:

i. mixing raw materials for preparing the first microwave ferrite material according to formula proportions, and performing wet ball milling to obtain a ball-milled material; where the wet ball milling is performed for 10-30 h at a rotational speed of 20-80 r/min; and the ball-milled material has particle size ranges of D50=0.005-2 μm and D90=0.05-4 μm; and ii. sequentially drying, sieving by a 30- to 100-mesh sieve, and pre-sintering the ball-milled material obtained in step (a) to obtain the first microwave ferrite material; where the drying is performed at 100-250° C., and the drying ends when a moisture content decreases to 0.01-10%; a heating rate for the pre-sintering is 0.3-4° C./min; the pre-sintering is performed at 1100-1350° C.; and a heat preservation time for the pre-sintering is 6-15 h.

A preparation method for the second microwave ferrite material in step (1) includes:

1. mixing raw materials for preparing the second microwave ferrite material according to formula proportions, and performing wet ball milling to obtain a ball-milled material; where the wet ball milling is performed for 10-30 h at a rotational speed of 20-80 r/min; and the ball-milled material has particle size ranges of D50=0.005-2 μm and D90=0.05-4 μm; and
2. sequentially drying, sieving and pre-sintering the ball-milled material obtained in step (I) to obtain the second microwave ferrite material; where the drying is performed at 100-250° C., and the drying ends when a moisture content decreases to 0.01-10%; the pre-sintering is performed at 1100-1400° C.; a heat preservation time for the pre-sintering is 6-15 h; a heating rate for the pre-sintering is 0.3-4° C./min; during the pre-sintering, oxygen introduction begins when the pre-sintering temperature is reached; and during the pre-sintering, the oxygen introduction ends at 100-500° C. lower than the pre-sintering temperature.

Any numerical range in the present application includes not only the listed point values but also any unlisted point values within the numerical range. Due to the limitation of space and the consideration of simplicity, specific point values included in the range are not exhaustively listed in the present application.

Compared with the existing art, the present application has the beneficial effects described below.

After tests, the two-component microwave ferrite provided in the present application has a ferromagnetic resonance linewidth ΔH≤18 Oe, a saturation magnetic moment 4πMs≤1260 Gs, a dielectric loss $tg\delta_e \leq 5.4\times10^{-4}$, and a Curie temperature $T_c \geq 260°$ C. Therefore, the material of the present application has a relatively small resonance linewidth, a relatively low saturation magnetic moment, a relatively low dielectric loss and a relatively high Curie temperature, greatly improving the stability and reliability of the microwave ferrite material, thereby expanding the application range of a two-component microwave ferrite.

DETAILED DESCRIPTION

Technical solutions of the present application are further described below through specific examples. Those skilled in the art are to understand that the examples described herein are used to facilitate the understanding of the present application and are not to be construed as specific limitations to the present application.

Example 1

This example provides a preparation method for a two-component microwave ferrite material, where the two-component microwave ferrite includes a first microwave ferrite material and a second microwave ferrite material.

The first microwave ferrite material is $Y_{(3-2a-c-d-e)}Ca_{(2a+c+d+e)}Fe_{(5-a-b-c-d-e)}V_aAl_bZr_cSn_dMn_eO_{12}$, where a=0.35, b=0.15, c=0.2, d=0.1, and e=0.04.

The second microwave ferrite material is $Gd_{(3-2A-C-D)}Ca_{(2A+C+D)}Fe_{(5-A-B-C-D-E)}V_AAl_BGe_CIn_DTi_EO_{12}$, where A=0.35, B=0.05, C=0.1, D=0.1, and E=0.05.

The preparation method for the two-component microwave ferrite material includes the steps described below.

a. The first microwave ferrite material and the second microwave ferrite material were mixed uniformly at a mass ratio of 1:1 to obtain raw materials; and the raw materials, zirconium balls and deionized water were mixed at a mass ratio of 1:4:1 and subjected to wet ball milling for 26 h at a rotational speed of 20 r/min; where a mass ratio of the large-diameter zirconium balls to the small-diameter zirconium balls was 3:1, the large-diameter zirconium balls had a diameter of 5 mm, and the small-diameter zirconium balls had a diameter of 2 mm; and the obtained ball-milled material had particle sizes of D50=0.85 μm and D90=2.85 μm.

b. The ball-milled material obtained in step (1) was dried at 120° C. until a moisture content decreased to 0.5%, sieved by a 40-mesh sieve, and granulated; where the sieved ball-milled material was granulated by being mixed with a binder uniformly and sieved by a 40-mesh sieve under a pressure of 650 kg/cm$^2$ to obtain granulated particles; the binder was a 5 wt % solution of polypropenyl alcohol, and a mass of the solution of polypropenyl alcohol was 7% of a mass of the dried ball-milled material.

c. The granulated particles in step (2) were sequentially molded and sintered to obtain the two-component microwave ferrite material; where the granulated particles in step (2) were molded by being pressed in a mold into a round green body with a molding density of 3.5 g/cm$^3$; and the granulated particles in step (2) were sintered at 1250° C., where a heat preservation time was 5 h, and a heating rate was 1° C./min; and oxygen introduction began 2 h before heat preservation ended, and after the sintering, the oxygen introduction ended when the temperature decreased to 900° C.

A preparation method for the first microwave ferrite material in step (1) includes the steps described below.

i. Required raw materials were calculated and weighed according to the chemical formula of the first microwave ferrite material; the weighed raw materials were put into a ball mill jar, and the raw materials, zirconium balls, deionized water and ammonium citrate were mixed at a mass ratio of 1:4:1:0.003 and subjected to wet ball milling for 16 h at a rotational speed of 20 r/min, where a mass ratio of the large-diameter zirconium balls to the small-diameter zirconium balls was 3:1, the large-diameter zirconium balls had a diameter of 5 mm, and the small-diameter zirconium balls had a diameter of 2 mm; and the obtained ball-milled material had particle sizes of D50=0.85 μm and D90=2.85 μm.

ii. The ball-milled material obtained in step (a) was sequentially dried, sieved by a 60-mesh sieve, and pre-sintered to obtain the first microwave ferrite material; where the ball-milled material was dried at 150° C. until a moisture content decreased to 0.5%; the ball-milled material was pre-sintered at 1150° C., where a heat preservation time was 6 h, and a heating rate was 0.3° C./min; and oxygen introduction began when the temperature reached the pre-sintering temperature, and after the pre-sintering, the oxygen introduction ended when the temperature decreased to 680° C.

A preparation method for the second microwave ferrite material in step (1) includes the steps described below.

1. Required raw materials were calculated and weighed according to the chemical formula of the second microwave ferrite material; the weighed raw materials were put into a ball mill jar, and the raw materials, zirconium balls, deionized water and ammonium citrate were mixed at a mass ratio of 1:4:1:0.003 and subjected to wet ball milling for 16 h at a rotational speed of 20 r/min, where a mass ratio of the large-diameter zirconium balls to the small-diameter zirconium balls was 3:1, the large-diameter zirconium balls had a diameter of 5 mm, and the small-diameter zirconium balls had a diameter of 2 mm; and the obtained ball-milled material had particle sizes of D50=0.85 μm and D90=2.85 μm.
2. The ball-milled material obtained in step (I) was sequentially dried, sieved by a 30-mesh sieve, and pre-sintered to obtain the second microwave ferrite material; where the ball-milled material was dried at 150° C. until a moisture content decreased to 0.5%; the ball-milled material was pre-sintered at 1120° C., where a heat preservation time was 8 h, and a heating rate was 0.8° C./min; and oxygen introduction began when the temperature reached the pre-sintering temperature, and after the pre-sintering, the oxygen introduction ended when the temperature decreased to 680° C.

The magnetic properties measured after the obtained sample was ground are shown in Table 1.

Example 2

This example provides a preparation method for a two-component microwave ferrite material, where the two-component microwave ferrite includes a first microwave ferrite material and a second microwave ferrite material.

The first microwave ferrite material is $Y_{(3-2a-c-d-e)}Ca_{(2a+c+d+e)}Fe_{(5-a-b-c-d-e)}V_aAl_bZr_cIn_dMn_eO_{12}$, where a=0.25, b=0.25, c=0.1, d=0.2, and e=0.05.

The second microwave ferrite material is $Gd_{(3-2A-C-D)}Ca_{(2A+C+D)}Fe_{(5-A-B-C-D-E)}V_AAl_BGe_CIn_DTi_EO_{12}$, where A=0.25, B=0.05, C=0.2, D=0.3, and E=0.1.

The preparation method for the two-component microwave ferrite material includes the steps described below.

a. The first microwave ferrite material and the second microwave ferrite material were mixed uniformly at a mass ratio of 1:3 to obtain raw materials; and the raw materials, zirconium balls and acetone were mixed at a mass ratio of 1:7:1.3 and subjected to wet ball milling for 8 h at a rotational speed of 40 r/min; where a mass ratio of the large-diameter zirconium balls to the small-diameter zirconium balls was 5:2, the large-diameter zirconium balls had a diameter of 10 mm, and the small-diameter zirconium balls had a diameter of 4 mm; and the obtained ball-milled material had particle sizes of D50=1.2 μm and D90=2.5 μm.

b. The ball-milled material obtained in step (1) was dried at 100° C. until a moisture content decreased to 2.5%, sieved by a 30-mesh sieve, and granulated; where the sieved ball-milled material was granulated by being mixed with a binder uniformly and sieved by a 30-mesh sieve under a pressure of 300 kg/cm$^2$ to obtain granulated particles; the binder was a 5 wt % solution of polypropenyl alcohol, and a mass of the solution of polypropenyl alcohol was 8% of a mass of the dried ball-milled material.

c. The granulated particles in step (2) were sequentially molded and sintered to obtain the two-component microwave ferrite material; where the granulated particles in step (2) were molded by being pressed in a mold into a round green body with a molding density of 3.0 g/cm$^3$; and the granulated particles in step (2) were sintered at 1260° C., where a heat preservation time was 10 h, and a heating rate was 0.8° C./min; and oxygen introduction began 4 h before heat preservation ended, and after the sintering, the oxygen introduction ended when the temperature decreased to 680° C.

A preparation method for the first microwave ferrite material in step (1) includes the steps described below.

i. Required raw materials were calculated and weighed according to the chemical formula of the first microwave ferrite material; the weighed raw materials were put into a ball mill jar, and the raw materials, zirconium balls, alcohol and ammonium citrate were mixed at a mass ratio of 1:5.5:1.2:0.01 and subjected to wet ball milling for 10 h at a rotational speed of 10 r/min, where a mass ratio of the large-diameter zirconium balls to the small-diameter zirconium balls was 4:1.5, the large-diameter zirconium balls had a diameter of 5 mm, and the small-diameter zirconium balls had a diameter of 3 mm; and the obtained ball-milled material had particle sizes of D50=1 μm and D90=3 μm.

ii. The ball-milled material obtained in step (a) was sequentially dried, sieved by a 30-mesh sieve, and pre-sintered to obtain the first microwave ferrite material; where the ball-milled material was dried at 100° C. until a moisture content decreased to 0.5%; the ball-milled material was pre-sintered at 1180° C., where a heat preservation time was 7 h, and a heating rate was 1.6° C./min; and oxygen introduction began when the temperature reached the pre-sintering temperature, and after the pre-sintering, the oxygen introduction ended when the temperature decreased to 905° C.

A preparation method for the second microwave ferrite material in step (1) includes the steps described below.

1. Required raw materials were calculated and weighed according to the chemical formula of the second microwave ferrite material; the weighed raw materials were put into a ball mill jar, and the raw materials, zirconium balls, alcohol and ammonium citrate were mixed at a mass ratio of 1:5.5:1.2:0.01 and subjected to wet ball milling for 10 h at a rotational speed of 10 r/min, where a mass ratio of the large-diameter zirconium balls to the small-diameter zirconium balls was 4:1.5, the large-diameter zirconium balls had a diameter of 5 mm, and the small-diameter zirconium balls had a diameter of 3 mm; and the obtained ball-milled material had particle sizes of D50=1 μm and D90=3 μm.

2. The ball-milled material obtained in step (I) was sequentially dried, sieved by a 30-mesh sieve, and pre-sintered to obtain the second microwave ferrite material; where the ball-milled material was dried at 100° C. until a moisture content decreased to 0.5%; the ball-milled material was pre-sintered at 1320° C., where a heat preservation time was 9 h, and a heating rate was 1° C./min; and oxygen introduction began when the temperature reached the pre-sintering temperature, and after the pre-sintering, the oxygen introduction ended when the temperature decreased to 905° C.

The magnetic properties measured after the obtained sample was ground are shown in Table 1.

Example 3

This example provides a preparation method for a two-component microwave ferrite material, where the two-component microwave ferrite includes a first microwave ferrite material and a second microwave ferrite material.

The first microwave ferrite material is $Y_{(3-2a-c-d-e)}Ca_{(2a+c+d+e)}Fe_{(5-a-b-c-d-e)}V_aAl_bZr_cSn_dMn_eO_{12}$, where a=0.3, b=0.2, c=0.05, d=0.25, and e=0.1.

The second microwave ferrite material is $Gd_{(3-2A-C-D)}Ca_{(2A+C+D)}Fe_{(5-A-B-C-D-E)}V_AAl_BGe_CIn_DTi_EO_{12}$, where A=0.1, B=0.3, C=0.05, D=0.5, and E=0.2.

The preparation method for the two-component microwave ferrite material includes the steps described below.

a. The first microwave ferrite material and the second microwave ferrite material were mixed uniformly at a mass ratio of 1:1 to obtain raw materials; and the raw materials, zirconium balls and n-propanol were mixed at a mass ratio of 1:6:1.4 and subjected to wet ball milling for 20 h at 60 r/min; where a mass ratio of the large-diameter zirconium balls to the small-diameter zirconium balls was 1:1, the large-diameter zirconium balls had a diameter of 6 mm, and the small-diameter zirconium balls had a diameter of 2 mm; and the obtained ball-milled material had particle sizes of D50=0.5 μm and D90=4 μm.

b. The ball-milled material obtained in step (1) was dried at 250° C. until a moisture content decreased to 10%, sieved by a 40-mesh sieve, and granulated; where the sieved ball-milled material was granulated by being mixed with a binder uniformly and sieved by a 40-mesh sieve under a pressure of 750 kg/cm$^2$ to obtain granulated particles; the binder was a 5 wt % solution of polypropenyl alcohol, and a mass of the solution of polypropenyl alcohol was 9% of a mass of the dried ball-milled material.

c. The granulated particles in step (2) were sequentially molded and sintered to obtain the two-component microwave ferrite material; where the granulated particles in step (2) were molded by being pressed in a mold into a round green body with a molding density of 3.8 $g/cm^3$; and the granulated particles in step (2) were sintered at 1300° C., where a heat preservation time was 15 h, and a heating rate was 1.2° C./min; and oxygen introduction began 6 h before heat preservation ended, and after the sintering, the oxygen introduction ended when the temperature decreased to 1000° C.

A preparation method for the first microwave ferrite material in step (1) includes the steps described below.

i. Required raw materials were calculated and weighed according to the chemical formula of the first microwave ferrite material; the weighed raw materials were put into a ball mill jar, and the raw materials, zirconium balls, n-propanol and ammonium citrate were mixed at a mass ratio of 1:7:1.3:0.08 and subjected to wet ball milling for 8 h at a rotational speed of 40 r/min, where a mass ratio of the large-diameter zirconium balls to the small-diameter zirconium balls was 5:2, the large-diameter zirconium balls had a diameter of 10 mm, and the small-diameter zirconium balls had a diameter of 4 mm; and the obtained ball-milled material had particle sizes of D50=1.2 μm and D90=2.5 μm.

ii. The ball-milled material obtained in step (a) was sequentially dried, sieved by a 40-mesh sieve, and pre-sintered to obtain the first microwave ferrite material; where the ball-milled material was dried at 120° C. until a moisture content decreased to 3.5%; the ball-milled material was pre-sintered at 1100° C., where a heat preservation time was 8 h, and a heating rate was 1.2° C./min; and oxygen introduction began when the temperature reached the pre-sintering temperature, and after the pre-sintering, the oxygen introduction ended when the temperature decreased to 900° C.

A preparation method for the second microwave ferrite material in step (1) includes the steps described below.

1. Required raw materials were calculated and weighed according to the chemical formula of the second microwave ferrite material; the weighed raw materials were put into a ball mill jar, and the raw materials, zirconium balls, n-propanol and ammonium citrate were mixed at a mass ratio of 1:7:1.3:0.08 and subjected to wet ball milling for 8 h at a rotational speed of 40 r/min, where a mass ratio of the large-diameter zirconium balls to the small-diameter zirconium balls was 5:2, the large-diameter zirconium balls had a diameter of 10 mm, and the small-diameter zirconium balls had a diameter of 4 mm; and the obtained ball-milled material had particle sizes of D50=1.2 μm and D90=2.5 μm.

2. The ball-milled material obtained in step (a) was sequentially dried, sieved by a 40-mesh sieve, and pre-sintered to obtain the second microwave ferrite material; where the ball-milled material was dried at 120° C. until a moisture content decreased to 0.01%; the ball-milled material was pre-sintered at 1200° C., where a heat preservation time was 7 h, and a heating rate was 1.2° C./min; and oxygen introduction began when the temperature reached the pre-sintering temperature, and after the pre-sintering, the oxygen introduction ended when the temperature decreased to 1000° C.

The magnetic properties measured after the obtained sample was ground are shown in the table below.

Example 4

This example provides a preparation method for a two-component microwave ferrite material, where the two-component microwave ferrite includes a first microwave ferrite material and a second microwave ferrite material.

The first microwave ferrite material is $Y_{(3-2a-c-d-e)}Ca_{(2a+c+d+e)}Fe_{(5-a-b-c-d-e)}V_aAl_bZr_cSn_dMn_eO_{12}$, where a=0.4, b=0.1, c=0.35, d=0.05, and e=0.5.

The second microwave ferrite material is $Gd_{(3-2A-C-D)}Ca_{(2A+C+D)}Fe_{(5-A-B-C-D-E)}V_AAl_BGe_CIn_DTi_EO_{12}$, where A=0.15, B=0.25, C=0.4, D=0.2, and E=0.4.

The preparation method for the two-component microwave ferrite material includes the steps described below.

a. The first microwave ferrite material and the second microwave ferrite material were mixed uniformly at a mass ratio of 1:1 to obtain raw materials; and the raw materials, zirconium balls and n-propanol were mixed at a mass ratio of 1:6.5:2 and subjected to wet ball milling for 30 h at 80 r/min; where a mass ratio of the large-diameter zirconium balls to the small-diameter zirconium balls was 2.5:4, the large-diameter zirconium balls had a diameter of 7 mm, and the small-diameter zirconium balls had a diameter of 1 mm; and the obtained ball-milled material had particle sizes of D50=0.3 μm and D90=2 μm.

b. The ball-milled material obtained in step (1) was dried at 250° C. until a moisture content decreased to 10%, sieved by a 40-mesh sieve, and granulated; where the sieved ball-milled material was granulated by being mixed with a binder uniformly and sieved by a 40-mesh sieve under a pressure of 750 $kg/cm^2$ to obtain granulated particles; the binder was a 5 wt % solution of polypropenyl alcohol, and a mass of the solution of polypropenyl alcohol was 10% of a mass of the dried ball-milled material.

c. The granulated particles in step (2) were sequentially molded and sintered to obtain the two-component microwave ferrite material; where the granulated particles in step (2) were molded by being pressed in a mold into a round green body with a molding density of 3.8 $g/cm^3$; and the granulated particles in step (2) were sintered at 1400° C., where a heat preservation time was 20 h, and a heating rate was 1.2° C./min; and oxygen introduction began 6 h before heat preservation ended, and after the sintering, the oxygen introduction ended when the temperature decreased to 1000° C.

A preparation method for the first microwave ferrite material in step (1) includes the steps described below.

i. Required raw materials were calculated and weighed according to the chemical formula of the first microwave ferrite material; the weighed raw materials were put into a ball mill jar, and the raw materials, zirconium balls, n-propanol and ammonium citrate were mixed at a mass ratio of 1:6:2:1.4 and subjected to wet ball milling for 22 h at a rotational speed of 60 r/min, where a mass ratio of the large-diameter zirconium balls to the small-diameter zirconium balls was 1:1, the large-diameter zirconium balls had a diameter of 6 mm, and the small-diameter zirconium balls had a diameter of 2 mm; and the obtained ball-milled material had particle sizes of D50=0.5 μm and D90=4 μm.

ii. The ball-milled material obtained in step (a) was sequentially dried, sieved by a 40-mesh sieve, and pre-sintered to obtain the first microwave ferrite material; where the ball-milled material was dried at 120° C. until a moisture content decreased to 3.5%; the ball-milled material was pre-sintered at 1300° C., where a heat preservation time was 10 h, and a heating rate was 1.2° C./min; and oxygen introduction began when the temperature reached the pre-sintering temperature, and after the pre-sintering, the oxygen introduction ended when the temperature decreased to 900° C.

A preparation method for the second microwave ferrite material in step (1) includes the steps described below.

1. Required raw materials were calculated and weighed according to the chemical formula of the second microwave ferrite material; the weighed raw materials were put into a ball mill jar, and the raw materials, zirconium balls, n-propanol and ammonium citrate were mixed at a mass ratio of 1:6:2:1.4 and subjected to wet ball milling for 22 h at a rotational speed of 60 r/min, where a mass ratio of the large-diameter zirconium balls to the small-diameter zirconium balls was 1:1, the large-diameter zirconium balls had a diameter of 6 mm, and the small-diameter zirconium balls had a diameter of 2 mm; and the obtained ball-milled material had particle sizes of D50=0.5 μm and D90=4 μm.
2. The ball-milled material obtained in step (a) was sequentially dried, sieved by a 40-mesh sieve, and pre-sintered to obtain the second microwave ferrite material; where the ball-milled material was dried at 120° C. until a moisture content decreased to 0.01%; the ball-milled material was pre-sintered at 1250° C., where a heat preservation time was 15 h, and a heating rate was 4° C./min; and oxygen introduction began when the temperature reached the pre-sintering temperature, and after the pre-sintering, the oxygen introduction ended when the temperature decreased to 1000° C.

The magnetic properties measured after the obtained sample was ground are shown in Table 1.

Example 5

This example provides a preparation method for a two-component microwave ferrite material, where the two-component microwave ferrite includes a first microwave ferrite material and a second microwave ferrite material.

The first microwave ferrite material is $Y_{(3-2a-c-d-e)}Ca_{(2a+c+d+e)}Fe_{(5-a-b-c-d-e)}V_aAl_bZr_cSn_dMn_eO_{12}$, where a=0.25, b=0.25, c=0.7, d=0.1, and e=0.35.

The second microwave ferrite material is $Gd_{(3-2A-C-D)}Ca_{(2A+C+D)}Fe_{(5-A-B-C-D-E)}V_AAl_BGe_CIn_DTi_EO_{12}$, where A=0.05, B=0.35, C=0.3, D=0.45, and E=0.3.

The preparation method for the two-component microwave ferrite material includes the steps described below.

a. The first microwave ferrite material and the second microwave ferrite material were mixed uniformly at a mass ratio of 1:1 to obtain raw materials; and the raw materials, zirconium balls and alcohol were mixed at a mass ratio of 1:5.5:2.5 and subjected to wet ball milling for 10 h at a rotational speed of 80 r/min; where a mass ratio of the large-diameter zirconium balls to the small-diameter zirconium balls was 4:1.5, the large-diameter zirconium balls had a diameter of 5 mm, and the small-diameter zirconium balls had a diameter of 3 mm; and the obtained ball-milled material had particle sizes of D50=1.01 μm and D90=3 μm.
b. The ball-milled material obtained in step (1) was dried at 250° C. until a moisture content decreased to 0.5%, sieved by a 40-mesh sieve, and granulated; where the sieved ball-milled material was granulated by being mixed with a binder uniformly and sieved by a 100-mesh sieve under a pressure of 1200 kg/cm$^2$ to obtain granulated particles; the binder was a 5 wt % solution of polypropenyl alcohol, and a mass of the solution of polypropenyl alcohol was 15% of a mass of the dried ball-milled material.
c. The granulated particles in step (2) were sequentially molded and sintered to obtain the two-component microwave ferrite material; where the granulated particles in step (2) were molded by being pressed in a mold into a round green body with a molding density of 4.0 g/cm$^3$; and the granulated particles in step (2) were sintered at 1500° C., where a heat preservation time was 30 h, and a heating rate was 1.5° C./min; and oxygen introduction began 1 h before heat preservation ended, and after the sintering, the oxygen introduction ended when the temperature decreased to 1200° C.

A preparation method for the first microwave ferrite material in step (1) includes the steps described below.

i. Required raw materials were calculated and weighed according to the chemical formula of the first microwave ferrite material; the weighed raw materials were put into a ball mill jar, and the raw materials, zirconium balls, aqueous ammonia and ammonium citrate were mixed at a mass ratio of 1:6.5:2.5:0.01 and subjected to wet ball milling for 40 h at a rotational speed of 80 r/min, where a mass ratio of the large-diameter zirconium balls to the small-diameter zirconium balls was 3.5:3, the large-diameter zirconium balls had a diameter of 7 mm, and the small-diameter zirconium balls had a diameter of 1 mm; and the obtained ball-milled material had particle sizes of D50=0.3 μm and D90=2 μm.
ii. The ball-milled material obtained in step (a) was sequentially dried, sieved by a 100-mesh sieve, and pre-sintered to obtain the first microwave ferrite material; where the ball-milled material was dried at 250° C. until a moisture content decreased to 1.5%; the ball-milled material was pre-sintered at 1320° C., where a heat preservation time was 15 h, and a heating rate was 3.5° C./min; and oxygen introduction began when the temperature reached the pre-sintering temperature, and after the pre-sintering, the oxygen introduction ended when the temperature decreased to 900° C.

A preparation method for the second microwave ferrite material in step (1) includes the steps described below.

1. Required raw materials were calculated and weighed according to the chemical formula of the second microwave ferrite material; the weighed raw materials were put into a ball mill jar, and the raw materials, zirconium balls, acetone and ammonium citrate were mixed at a mass ratio of 1:6.5:2.5:0.01 and subjected to wet ball milling for 10 h at a rotational speed of 80 r/min, where a mass ratio of the large-diameter zirconium balls to the small-diameter zirconium balls was 3.5:3, the large-diameter zirconium balls had a diameter of 7 mm, and the small-diameter zirconium balls had a diameter of 1 mm; and the obtained ball-milled material had particle sizes of D50=0.3 μm and D90=2 μm.
2. The ball-milled material obtained in step (I) was sequentially dried, sieved by a 30-mesh sieve, and pre-sintered to obtain the second microwave ferrite material; where the ball-milled material was dried at 200° C. until a moisture content decreased to 6%; the ball-milled material was pre-sintered at 1380° C., where a heat preservation time was 20 h, and a heating rate was 1.5° C./min; and oxygen introduction began when the temperature reached the pre-sintering temperature, and after the pre-sintering, the oxygen introduction ended when the temperature decreased to 900° C.

The magnetic properties measured after the obtained sample was ground are shown in Table 1.

Example 6

This example provides a preparation method for a two-component microwave ferrite material, where the two-component microwave ferrite includes a first microwave ferrite material and a second microwave ferrite material.

The preparation method in this example was the same as that in Example 1 except that in step (1), the first microwave ferrite material and the second microwave ferrite material were mixed uniformly at a mass ratio of 3:1 rather than 1:1.

The magnetic properties measured after the obtained sample was ground are shown in Table 1.

Example 7

This example provides a preparation method for a two-component microwave ferrite material, where the two-component microwave ferrite includes a first microwave ferrite material and a second microwave ferrite material.

The preparation method in this example was the same as that in Example 1 except that in step (1), the first microwave ferrite material and the second microwave ferrite material were mixed uniformly at a mass ratio of 3:2 rather than 1:1.

The magnetic properties measured after the obtained sample was ground are shown in Table 1.

Example 8

This example provides a preparation method for a two-component microwave ferrite material, where the two-component microwave ferrite includes a first microwave ferrite material and a second microwave ferrite material.

The preparation method in this example was the same as that in Example 1 except that in step (1), the first microwave ferrite material and the second microwave ferrite material were mixed uniformly at a mass ratio of 1:2 rather than 1:1.

The magnetic properties measured after the obtained sample was ground are shown in Table 1.

Comparative Example 1

According to an ion substitution mechanism, this comparative example provides a microwave ferrite material: $Y_{1.5}Ca_{1.5}Fe_{3.9}V_{0.6}Al_{0.2}Sn_{0.3}$.

A preparation method for the microwave ferrite material includes the steps described below.

a. Raw materials were calculated and weighed according to the chemical formula; the weighed raw materials were put into a ball mill jar, and the raw materials, zirconium balls, deionized water and ammonium citrate were mixed at a mass ratio of 1:4:1:0.1 and subjected to wet ball milling for 16 h at a rotational speed of 20 r/min, where a mass ratio of the large-diameter zirconium balls to the small-diameter zirconium balls was 3:1, the large-diameter zirconium balls had a diameter of 5 mm, and the small-diameter zirconium balls had a diameter of 2 mm; and the obtained ball-milled material had particle sizes of D50=0.85 μm and D90=2.85 μm.

b. The ball-milled material obtained in step (1) was sequentially dried, sieved by a 30-mesh sieve, and pre-sintered; where the ball-milled material was dried at 100° C. until a moisture content decreased to 0.5%; the ball-milled material was pre-sintered at 1150° C., a heat preservation time was 6 h, and a heating rate was 2.6° C./min; and oxygen introduction began when the temperature reached the pre-sintering temperature, and after the pre-sintering, the oxygen introduction ended when the temperature decreased to 900° C.

c. The pre-sintered ball-milled material obtained in step (2) was crushed up to obtain powder and sieved by a 30-mesh sieve, and the powder, zirconium balls and deionized water were mixed at a mass ratio of 1:4:1 and subjected to wet ball milling for 26 h at a rotational speed of 20 r/min, where a mass ratio of the large-diameter zirconium balls to the small-diameter zirconium balls was 3:1, the large-diameter zirconium balls had a diameter of 5 mm, and the small-diameter zirconium balls had a diameter of 2 mm; and the obtained ball-milled material had particle sizes of D50=0.85 μm and D90=2.85 μm.

d. The ball-milled material obtained in step (3) was dried at 250° C. until a moisture content decreased to 8%, sieved by a 40-mesh sieve, and granulated; where the sieved ball-milled material was granulated by being mixed with a binder uniformly and sieved by a 30-mesh sieve under a pressure of 300 kg/$cm^2$ to obtain granulated particles; the binder was a 5 wt % solution of polypropenyl alcohol, and a mass of the solution of polypropenyl alcohol was 7% of a mass of the dried ball-milled material in step (3).

e. The granulated particles in step (4) were sequentially molded and sintered to obtain the two-component microwave ferrite material; where the granulated particles in step (4) were molded by being pressed in a mold into a round green body with a molding density of 3.8 g/$cm^3$; and the granulated particles in step (4) were sintered at 1500° C., where a heat preservation time was 10 h, and a heating rate was 0.8° C./min; and oxygen introduction began 6 h before heat preservation ended, and after the sintering, the oxygen introduction ended when the temperature decreased to 1000° C.

The magnetic properties measured after the obtained sample was ground are shown in Table 1.

Comparative Example 2

According to an ion substitution mechanism, this comparative example provides a microwave ferrite material: $Y_{2.65}Ca_{0.35}Fe_{4.6}Sn_{0.35}Mn_{0.05}$.

A preparation method for the microwave ferrite material includes the steps described below.

a. Raw materials were calculated and weighed according to the chemical formula; the weighed raw materials were put into a ball mill jar, and the raw materials, zirconium balls, deionized water and ammonium citrate were mixed at a mass ratio of 1:5.5:1.2:0.03 and subjected to wet ball milling for 10 h at a rotational speed of 10 r/min, a mass ratio of the large-diameter zirconium balls to the small-diameter zirconium balls was 4:1.5, the large-diameter zirconium balls had a diameter of 5 mm, and the small-diameter zirconium balls had a diameter of 3 mm; and the obtained ball-milled material had particle sizes of D50=1 μm and D90=3 μm.

b. The ball-milled material obtained in step (1) was sequentially dried, sieved by a 30-mesh sieve, and pre-sintered; where the ball-milled material was dried at 100° C. until a moisture content decreased to 0.5%; the ball-milled material was pre-sintered at 1180° C., a heat preservation time was 7 h, and a heating rate was 1.8° C./min; and oxygen introduction began when the temperature reached the pre-sintering temperature, and after the pre-sintering, the oxygen introduction ended when the temperature decreased to 900° C.

c. The pre-sintered ball-milled material obtained in step (2) was crushed up to obtain powder and sieved by a 30-mesh sieve, and the powder, zirconium balls and deionized water were mixed at a mass ratio of 1:6:1.3 and subjected to wet ball milling for 8 h at a rotational speed of 40 r/min, where a mass ratio of the large-diameter zirconium balls to the small-diameter zirconium balls was 5:2, the large-diameter zirconium balls had a diameter of 10 mm, and the small-diameter zirconium balls had a diameter of 4 mm; and the obtained ball-milled material had particle sizes of D50=1.2 μm and D90=2.5 μm.

d. The ball-milled material obtained in step (3) was dried at 250° C. until a moisture content decreased to 8%, sieved by a 40-mesh sieve, and granulated; where the sieved ball-milled material was granulated by being mixed with a binder uniformly and sieved by a 30-mesh sieve under a pressure of 300 kg/cm$^2$ to obtain granulated particles; the binder was a 5 wt % solution of polypropenyl alcohol, and a mass of the solution of polypropenyl alcohol was 8% of a mass of the dried ball-milled material in step (3).

e. The granulated particles in step (4) were sequentially molded and sintered to obtain the two-component microwave ferrite material; where the granulated particles in step (4) were molded by being pressed in a mold into a round green body with a molding density of 3.8 g/cm$^3$; and the granulated particles in step (4) were sintered at 1420° C., where a heat preservation time was 11 h, and a heating rate was 0.8° C./min; and oxygen introduction began 6 h before heat preservation ended, and after the sintering, the oxygen introduction ended when the temperature decreased to 900° C.

The magnetic properties measured after the obtained sample was ground are shown in Table 1.

Comparative Example 3

According to an ion substitution mechanism, this comparative example provides a microwave ferrite material: $Y_{2.6}Ca_{0.4}Fe_{4.2}Al_{0.4}Zr_{0.4}$.

A preparation method for the microwave ferrite material includes the steps described below.

a. Raw materials were calculated and weighed according to the chemical formula; the weighed raw materials were put into a ball mill jar, and the raw materials, zirconium balls, deionized water and ammonium citrate were mixed at a mass ratio of 1:7:1.3:0.09 and subjected to wet ball milling for 8 h at a rotational speed of 40 r/min, where a mass ratio of the large-diameter zirconium balls to the small-diameter zirconium balls was 5:2, the large-diameter zirconium balls had a diameter of 10 mm, and the small-diameter zirconium balls had a diameter of 4 mm; and the obtained ball-milled material had particle sizes of D50=1.2 μm and D90=2.5 μm.

b. The ball-milled material obtained in step (1) was sequentially dried, sieved by a 40-mesh sieve, and pre-sintered; where the ball-milled material was dried at 120° C. until a moisture content decreased to 0.5%; the ball-milled material was pre-sintered at 1250° C., where a heat preservation time was 8 h, and a heating rate was 1° C./min; and oxygen introduction began when the temperature reached the pre-sintering temperature, and after the pre-sintering, the oxygen introduction ended when the temperature decreased to 900° C.

c. The pre-sintered ball-milled material obtained in step (2) was crushed up to obtain powder and sieved by a 30-mesh sieve, and the powder, zirconium balls and deionized water were mixed at a mass ratio of 1:6:1.4 and subjected to wet ball milling for 20 h at a rotational speed of 60 r/min, where a mass ratio of the large-diameter zirconium balls to the small-diameter zirconium balls was 1:1, the large-diameter zirconium balls had a diameter of 6 mm, and the small-diameter zirconium balls had a diameter of 2 mm; and the obtained ball-milled material had particle sizes of D50=0.5 μm and D90=4 μm.

d. The ball-milled material obtained in step (3) was dried at 250° C. until a moisture content decreased to 8%, sieved by a 40-mesh sieve, and granulated; where the sieved ball-milled material was granulated by being mixed with a binder uniformly and sieved by a 30-mesh sieve under a pressure of 350 kg/cm$^2$ to obtain granulated particles; the binder was a 5 wt % solution of polypropenyl alcohol, and a mass of the solution of polypropenyl alcohol was 8% of a mass of the dried ball-milled material in step (3).

e. The granulated particles in step (4) were sequentially molded and sintered to obtain the two-component microwave ferrite material; where the granulated particles in step (4) were molded by being pressed in a mold into a round green body with a molding density of 3.8 g/cm$^3$; and the granulated particles in step (4) were sintered at 1470° C., where a heat preservation time was 12 h, and a heating rate was 4° C./min; and oxygen introduction began 6 h before heat preservation ended, and after the sintering, the oxygen introduction ended when the temperature decreased to 1000° C.

The magnetic properties measured after the obtained sample was ground are shown in Table 1.

Comparative Example 4

According to an ion substitution mechanism, this comparative example provides a microwave ferrite material: $Y_{1.85}Ca_{1.15}Fe_{4.1}V_{0.2}Al_{0.05}Sn_{0.2}Zr_{0.35}Mn_{0.1}Ge_{0.2}$.

A preparation method for the microwave ferrite material includes the steps described below.

a. Raw materials were calculated and weighed according to the chemical formula; the weighed raw materials were put into a ball mill jar, and the raw materials, zirconium balls, deionized water and ammonium citrate were mixed at a mass ratio of 1:6:1.4:0.03 and subjected to wet ball milling for 20 h at a rotational speed of 60 r/min, where a mass ratio of the large-diameter zirconium balls to the small-diameter zirconium balls was 1:1, the large-diameter zirconium balls had a diameter of 6 mm, and the small-diameter zirconium balls had a diameter of 2 mm; and the obtained ball-milled material had particle sizes of D50=0.5 μm and D90=4 μm.

b. The ball-milled material obtained in step (1) was sequentially dried, sieved by a 30-mesh sieve, and pre-sintered; where the ball-milled material was dried at 100° C. until a moisture content decreased to 0.5%; the ball-milled material was pre-sintered at 1300° C., where a heat preservation time was 10 h, and a heating rate was 3.6° C./min; and oxygen introduction began when the temperature reached the pre-sintering temperature, and after the pre-sintering, the oxygen introduction ended when the temperature decreased to 900° C.

c. The pre-sintered ball-milled material obtained in step (2) was crushed up to obtain powder and sieved by a 30-mesh sieve, and the powder, zirconium balls and deionized water were mixed at a mass ratio of 1:7.5:2 and subjected to wet ball milling for 40 h at a rotational speed of 80 r/min, where a mass ratio of large-diameter zirconium balls to small-diameter zirconium balls was 3.5:4, the large-diameter zirconium balls had a diameter of 7 mm, and the small-diameter zirconium balls had a diameter of 1 mm; and the obtained ball-milled material had particle sizes of D50=0.3 μm and D90=2 μm.

d. The ball-milled material obtained in step (3) was dried at 250° C. until a moisture content decreased to 8%, sieved by a 40-mesh sieve, and granulated; where the sieved ball-milled material was granulated by being mixed with a binder uniformly and sieved by a 30-mesh sieve under a pressure of 300 kg/cm$^2$ to obtain granulated particles; the binder was a 5 wt % solution of polypropenyl alcohol, and a mass of the solution of polypropenyl alcohol was 10% of a mass of the dried ball-milled material in step (3).

e. The granulated particles in step (4) were sequentially molded and sintered to obtain the two-component microwave ferrite material; where the granulated particles in step (4) were molded by being pressed in a mold into a round green body with a molding density of 3.8 g/cm$^3$; and the granulated particles in step (4) were sintered at 1380° C., where a heat preservation time was 15 h, and a heating rate was 0.3° C./min; and oxygen introduction began 6 h before heat preservation ended, and after the sintering, the oxygen introduction ended when the temperature decreased to 1000° C.

The magnetic properties measured after the obtained sample was ground are shown in Table 1.

Comparative Example 5

According to an ion substitution mechanism, this comparative example provides a microwave ferrite material: $Y_{2.3}Ca_{0.7}Fe_{4.1}Sn_{0.4}Zr_{0.3}Mn_{0.2}Ti_{0.05}$.

A preparation method for the microwave ferrite material includes the steps described below.

a. Raw materials were calculated and weighed according to the chemical formula; the weighed raw materials were put into a ball mill jar, and the raw materials, zirconium balls, deionized water and ammonium citrate were mixed at a mass ratio of 1:7.5:2:0.1 and subjected to wet ball milling for 40 h at a rotational speed of 80 r/min, where a mass ratio of the large-diameter zirconium balls to the small-diameter zirconium balls was 3.5:4, the large-diameter zirconium balls had a diameter of 7 mm, and the small-diameter zirconium balls had a diameter of 1 mm; and the obtained ball-milled material had particle sizes of D50=0.3 μm and D90=2 μm.

b. The ball-milled material obtained in step (1) was sequentially dried, sieved by a 30-mesh sieve, and pre-sintered; where the ball-milled material was dried at 100° C. until a moisture content decreased to 0.5%; the ball-milled material was pre-sintered at 1320° C., where a heat preservation time was 15 h, and a heating rate was 3.6° C./min; and oxygen introduction began when the temperature reached the pre-sintering temperature, and after the pre-sintering, the oxygen introduction ended when the temperature decreased to 900° C.

c. The pre-sintered ball-milled material obtained in step (2) was crushed up to obtain powder and sieved by a 30-mesh sieve, and the powder, zirconium balls and deionized water were mixed at a mass ratio of 1:5.5:1.2 and subjected to wet ball milling for 10 h at a rotational speed of 10 r/min, where a mass ratio of the large-diameter zirconium balls to the small-diameter zirconium balls was 3.5:4, the large-diameter zirconium balls had a diameter of 5 mm, and the small-diameter zirconium balls had a diameter of 3 mm; and the obtained ball-milled material had particle sizes of D50=1 μm and D90=3 μm.

d. The ball-milled material obtained in step (3) was dried at 250° C. until a moisture content decreased to 8%, sieved by a 40-mesh sieve, and granulated; where the sieved ball-milled material was granulated by being mixed with a binder uniformly and sieved by a 30-mesh sieve under a pressure of 350 kg/cm$^2$ to obtain granulated particles; the binder was a 5 wt % solution of polypropenyl alcohol, and a mass of the solution of polypropenyl alcohol was 8% of a mass of the dried ball-milled material in step (3).

e. The granulated particles in step (4) were sequentially molded and sintered to obtain the two-component microwave ferrite material; where the granulated particles in step (4) were molded by being pressed in a mold into a round green body with a molding density of 3.8 g/cm$^3$; and the granulated particles in step (4) were sintered at 1400° C., where a heat preservation time was 5=15 h, and a heating rate was 3.3° C./min; and oxygen introduction began 6 h before heat preservation ended, and after the sintering, the oxygen introduction ended when the temperature decreased to 1000° C.

The magnetic properties measured after the obtained sample was ground are shown in Table 1.

The magnetic performance parameters of the microwave ferrites obtained in the examples and comparative examples are shown in Table 1.

TABLE 1

| | Saturation Magnetic Moment 4πMs (A/m) | Ferro magnetic Resonance Linewidth ΔH (Oe) | Dielectric Constant ε | Dielectric Loss $tg\delta_\varepsilon$ ($\times 10^{-4}$) | Curie Temperature $T_c$ (° C.) |
|---|---|---|---|---|---|
| Example 1 | 1250 | 15 | 14 | 1.58 | 265 |
| Example 2 | 1251 | 10 | 14.5 | 2 | 270 |
| Example 3 | 1253 | 18 | 13.8 | 1.2 | 265 |
| Example 4 | 1258 | 16 | 15 | 1.6 | 260 |
| Example 5 | 1257 | 12 | 14.8 | 2 | 275 |

TABLE 1-continued

| | Saturation Magnetic Moment $4\pi Ms$ (A/m) | Ferro magnetic Resonance Linewidth $\Delta H$ (Oe) | Dielectric Constant $\varepsilon$ | Dielectric Loss $tg\delta_e$ ($\times 10^{-4}$) | Curie Temperature $T_c$ (° C.) |
|---|---|---|---|---|---|
| Example 6 | 1249 | 14 | 13.9 | 1.69 | 270 |
| Example 7 | 1246 | 14 | 13.8 | 1.62 | 271 |
| Example 8 | 1252 | 16 | 14.1 | 1.58 | 269 |
| Comparative Example 1 | 700 | 25 | 13.8 | 3 | 200 |
| Comparative Example 2 | 1750 | 35 | 14 | 2.5 | 180 |
| Comparative Example 3 | 1100 | 45 | 14 | 4 | 220 |
| Comparative Example 4 | 1450 | 55 | 13.7 | 5 | 210 |
| Comparative Example 5 | 2000 | 68 | 14 | 5.6 | 195 |

As can be seen from Table 1, the two-component microwave ferrite provided in the present application has a ferromagnetic resonance linewidth $\Delta H \leq 18$ Oe, a saturation magnetic moment $4\pi Ms \leq 1260$ Gs, a dielectric loss $tg\delta_e \leq 2\times 10^{-4}$, and a Curie temperature $T_c \geq 260°$ C. As can be seen from the analysis of Comparative Examples 1 to 5, a one-component microwave ferrite material has a relatively large ferromagnetic resonance linewidth, a relatively high dielectric loss and a relatively low Curie temperature, thus greatly affecting the stability and reliability of the microwave ferrite material and affecting the use of a microwave communication device.

To sum up, after tests, the two-component microwave ferrite provided in the present application has a ferromagnetic resonance linewidth $\Delta H \leq 18$ Oe, a saturation magnetic moment $4\pi Ms \leq 1260$ Gs, a dielectric loss $tg\delta_e \leq 2\times 10^{-4}$, and a Curie temperature $T_c \geq 260°$ C. Therefore, the material of the present application has a relatively small resonance linewidth, a relatively low saturation magnetic moment, a relatively low dielectric loss and a relatively high Curie temperature, thereby greatly improving the stability and reliability of the microwave ferrite material and expanding the application range of a two-component microwave ferrite.

The objects, technical solutions and beneficial effects of the present application are described in more detail through the preceding specific examples. It is to be understood that the above are only specific examples of the present application and are not intended to limit the present application.

What is claimed is:

1. A two-component microwave ferrite material, wherein raw materials for preparing the two-component microwave ferrite material comprise a first microwave ferrite material and a second microwave ferrite material;

the first microwave ferrite material is $Y_{(3-2a-c-d-e)}Ca_{(2a+c+d+e)}Fe_{(5-a-b-c-d-e)}V_aAl_bZr_cSn_dMn_eO_{12}$, wherein $0\leq a\leq 0.5$, $0\leq b\leq 0.5$, $0\leq c\leq 0.7$, $0\leq d\leq 0.7$, $0\leq e\leq 0.7$, and a+b=0.5;

the second microwave ferrite material is $Gd_{(3-2A-C-D)}Ca_{(2A+C+D)}Fe_{(5-A-B-C-D-E)}V_AAl_BGe_CIn_DTi_EO_{12}$, wherein $0\leq A\leq 0.4$, $0\leq B\leq 0.4$, $0\leq C\leq 0.7$, $0\leq D\leq 0.7$, $0\leq E\leq 0.7$, and A+B=0.4.

2. The two-component microwave ferrite material according to claim 1, wherein a mass ratio of the first microwave ferrite material to the second microwave ferrite material is (1-3):(1-3).

3. A preparation method for the two-component microwave ferrite material according to claim 1, comprising:

(1) mixing the first microwave ferrite material and the second microwave ferrite material according to formula proportions, and then performing wet ball milling to obtain a ball-milled material;

(2) drying, sieving and granulating the ball-milled material obtained in step (1); and (3) molding and sintering particles from the granulating in step (2) sequentially to obtain the two-component microwave ferrite material.

4. The preparation method according to claim 3, wherein the wet ball milling in step (1) is performing the wet ball milling on raw materials, grinding balls and a dispersion medium at a mass ratio of 1:(4-7.5):(0.6-2.5);

optionally, the wet ball milling in step (1) is performed at a rotational speed of 20-80 r/min;

optionally, the wet ball milling in step (1) is performed for 10-30 h;

optionally, the grinding balls comprise zirconium balls or steel balls;

optionally, the grinding balls comprise large-diameter grinding balls and small-diameter grinding balls, wherein a mass ratio of the large-diameter grinding balls to the small-diameter grinding balls is (0.8-3): 1, and the large-diameter grinding balls have a diameter of 5-10 mm and the small-diameter grinding balls have a diameter of 1-4 mm;

optionally, the dispersion medium comprises any one or a combination of at least two of deionized water, alcohol, acetone, n-propanol or aqueous ammonia;

optionally, the ball-milled material in step (1) has particle size ranges of D50=0.005-2 μm and D90=0.05-4 μm.

5. The preparation method according to claim 3, wherein the drying in step (2) is performed at 100-250° C.;

optionally, the drying in step (2) ends when a moisture content decreases to 0.01-10%;

optionally, a sieve for the sieving in step (2) has a size of 30-100 mesh;

optionally, the granulating in step (2) comprises mixing the ball-milled material after the sieving with a binder uniformly and sieving under pressure to obtain granulated particles, wherein the binder comprises an aqueous solution of polyvinyl alcohol, the aqueous solution of polyvinyl alcohol has a concentration of 5-20 wt %, and a mass of the aqueous solution of polyvinyl alcohol is 5-10% of a mass of powder, and the sieving is performed under a pressure of 300-1200 kg/cm$^2$.

6. The preparation method according to claim 3, wherein the molding in step (3) comprises placing particles from the granulating in step (2) into a mold and pressing the particles from the granulating in step (2) into a green body in a specified shape;

optionally, the green body has a molding density of 3.0-4.0 g/cm$^3$;

optionally, the sintering in step (3) has a temperature of 1200-1500° C., a heat preservation time of 5-30 h, and a heating rate of 0.4-5° C./min;

optionally, during the sintering in step (3), oxygen introduction begins at 1-6 h before heat preservation ends, and oxygen introduction ends at 100-500° C. lower than sintering temperature.

7. The preparation method according to claim 3, wherein a preparation method for the first microwave ferrite material in step (1) comprises:

(a) mixing raw materials for preparing the first microwave ferrite material according to formula proportions, and performing wet ball milling to obtain a ball-milled material, wherein the wet ball milling in step (a) is performing the wet ball milling on the raw materials, grinding balls, a dispersion medium and a dispersant at a mass ratio of 1:(4-7.5):(0.6-2.5):(0.003-0.01); and (b) drying, sieving and pre-sintering the ball-milled material obtained in step (a) sequentially to obtain the first microwave ferrite material;

wherein the first microwave ferrite material is $Y_{(3-2a-c-d-e)}Ca_{(2a+c+d+e)}Fe_{(5-a-b-c-d-e)}V_aAl_bZr_cSn_dMn_eO_{12}$, wherein 0≤a≤0.5, 0≤b≤0.5, 0≤c≤0.7, 0≤d≤0.7, 0≤e≤0.7, and a+b=0.5;

optionally, the grinding balls in step (a) comprise zirconium balls;

optionally, the grinding balls in step (a) comprise large-diameter grinding balls and small-diameter grinding balls, wherein a mass ratio of the large-diameter grinding balls to the small-diameter grinding balls in step (a) is (0.8-3): 1, and the large-diameter grinding balls have a diameter of 5-10 mm and the small-diameter grinding balls have a diameter of 1-4 mm;

optionally, the dispersion medium in step (a) comprises any one or a combination of at least two of deionized water, alcohol, acetone, n-propanol or aqueous ammonia;

optionally, the dispersant in step (a) comprises ammonium citrate and/or aqueous ammonia;

optionally, the wet ball milling in step (a) is performed at a rotational speed of 20-80 r/min;

optionally, the wet ball milling in step (a) is performed for 10-30 h;

optionally, the ball-milled material in step (a) has particle size ranges of D50 =0.005-2 μm and D90 =0.05-4 μm;

optionally, the drying in step (b) is performed at 100-250° C.;

optionally, the drying in step (b) ends when a moisture content decreases to 0.01-10%;

optionally, a sieve for the sieving in step (b) has a size of 30-100 mesh;

optionally, the pre-sintering in step (b) is performed at 1100-1350° C.;

optionally, a heat preservation time for the pre-sintering in step (b) is 6-15 h;

optionally, a heating rate for the pre-sintering in step (b) is 0.3-4° C./min;

optionally, during the pre-sintering in step (b), oxygen introduction begins when a pre-sintering temperature is reached, and oxygen introduction ends at 100-500° C. lower than pre-sintering temperature.

8. The preparation method according to claim 3, wherein a preparation method for the second microwave ferrite material in step (1) comprises:

(I) mixing raw materials for preparing the second microwave ferrite material according to formula proportions, and performing wet ball milling to obtain a ball-milled material, wherein the wet ball milling in step (I) is performing the wet ball milling on the raw materials, grinding balls, a dispersion medium and a dispersant at a mass ratio of 1:(4-7.5):(0.6-2.5):(0.003-0.01) and performing the wet ball milling; and (II) drying, sieving and pre-sintering the ball-milled material obtained in step (I) sequentially to obtain the second microwave ferrite material;

wherein the second microwave ferrite material is $Gd_{(3-2A-C-D)}Ca_{(2A+C+D)}Fe_{(5-A-B-C-D-E)}V_AAl_BGe_CIn_DT_{iE}O_{12}$, wherein 0≤A≤0.4, 0≤B≤0.4, 0≤C≤0.7, 0 ≤D ≤0.7, 0≤E≤0.7, and A+B=0.4;

optionally, the grinding balls in step (I) comprise zirconium balls;

optionally, the grinding balls in step (I) comprise large-diameter grinding balls and small-diameter grinding balls, wherein a mass ratio of the large-diameter grinding balls to the small-diameter grinding balls in step (I) is (0.8-3): 1, and the large-diameter grinding balls have a diameter of 5-10 mm and the small-diameter grinding balls have a diameter of 1-4 mm;

optionally, the dispersion medium in step (I) comprises any one or a combination of at least two of deionized water, alcohol, acetone, n-propanol or aqueous ammonia;

optionally, the dispersant in step (I) comprises ammonium citrate and/or aqueous ammonia;

optionally, the wet ball milling in step (I) is performed at a rotational speed of 20-80 r/min;

optionally, the wet ball milling in step (I) is performed for 10-30 h;

optionally, the ball-milled material in step (I) has particle size ranges of D50=0.005-2 μm and D90=0.05-4 μm;

optionally, the drying in step (II) is performed at 100-250° C.;

optionally, the drying in step (II) ends when a moisture content decreases to 0.01-10%;

optionally, a sieve for the sieving in step (II) has a size of 30-100 mesh;

optionally, the pre-sintering in step (II) is performed at 1100-1400° C.;

optionally, a heat preservation time for the pre-sintering in step (II) is 8-20 h;

optionally, a heating rate for the pre-sintering in step (II) is 0.3-4° C./min;

optionally, during the pre-sintering in step (II), oxygen introduction begins when a pre-sintering temperature is reached, and oxygen introduction ends at 100-500° C. lower than pre-sintering temperature.

9. The preparation method according to claim 3, comprising:

(1) mixing the first microwave ferrite material and the second microwave ferrite material according to formula proportions, and then performing wet ball milling to obtain a ball-milled material; wherein the wet ball milling is performing the wet ball milling on raw materials, grinding balls and a dispersion medium at a mass ratio of 1: (4-7.5): (0.6-2.5) for 10-30 h at a rotational speed of 20-80 r/min; and the ball-milled material has particle size ranges of D50=0.005-2 μm and D90=0.05-4 μm;

(2) drying the ball-milled material obtained in step (1) at 100-250° C. until a moisture content decreases to 0.01-10%, sieving the ball-milled material by a 30-to 100-mesh sieve and then granulating;

wherein the granulating comprises mixing the sieved ball-milled material with a binder uniformly and sieving by a 30-to 100-mesh sieve under a pressure of 300-1200 kg/cm$^2$ to obtain granulated particles; and (3) sequentially molding and sintering the granulated particles in step (2) to obtain the two-component microwave ferrite material; wherein the molding comprises pressing the granulated particles in step (2) into a mold and pressing the granulated particles into a green body in a specified shape, and the green body has a molding density of 3.0-4.0 g/cm$^3$; and the sintering has a temperature of 1200-1500° C., a heat preservation time of 5-30 h, and a heating rate of 0.4-5° C./min; during the sintering, oxygen introduction begins at 1-6 h before heat preservation ends; and during the sintering, oxygen introduction ends at 100-500° C. lower than the sintering temperature;

wherein a preparation method for the first microwave ferrite material in step (1) comprises:

(a) mixing raw materials for preparing the first microwave ferrite material according to formula proportions, and performing wet ball milling to obtain a ball-milled material; wherein the wet ball milling is performed for 10-30 h at a rotational speed of 20-80 r/min; and the ball-milled material has particle size ranges of D50=0.005-2 μm and D90=0.05-4 μm; and (b) sequentially drying, sieving by a 30-to 100-mesh sieve, and pre-sintering the ball-milled material obtained in step (a) to obtain the first microwave ferrite material; wherein the drying is performed at 100-250° C., and the drying ends when a moisture content decreases to 0.01-10%; the pre-sintering is performed at 1100-1350° C.; a heat preservation time for the pre-sintering is 6-15 h; and a heating rate for the pre-sintering is 0.3-4° C./min;

wherein a preparation method for the second microwave ferrite material in step (1) comprises:

(I) mixing raw materials for preparing the second microwave ferrite material according to formula proportions, and performing wet ball milling to obtain a ball-milled material; wherein the wet ball milling is performed for 10-30 h at a rotational speed of 20-80 r/min; and the ball-milled material has particle size ranges of D50=0.005-2 μm and D90=0.05-4 μm; and (II) sequentially drying, sieving and pre-sintering the ball-milled material obtained in step (I) to obtain the second microwave ferrite material; wherein the drying is performed at 100-250° C., and the drying ends when a moisture content decreases to 0.01-10%; the pre-sintering is performed at 1100-1400° C.; and a heat preservation time for the pre-sintering is 8-20 h.

* * * * *